United States Patent
Lancaster et al.

(10) Patent No.: US 8,077,773 B2
(45) Date of Patent: Dec. 13, 2011

(54) SYSTEMS AND METHODS FOR HIGHLY EFFICIENT VIDEO COMPRESSION USING SELECTIVE RETENTION OF RELEVANT VISUAL DETAIL

(75) Inventors: Greg Lancaster, Calgary (CA); Matt Sherwood, Okotoks (CA); Leonard Thomas Bruton, Calgary (CA); Danny D. Lowe, Calgary (CA)

(73) Assignee: Worldplay (Barbados) Inc., Bridgetown (BB)

( * ) Notice: Subject to any disclaimer, the term of this patent is extended or adjusted under 35 U.S.C. 154(b) by 815 days.

(21) Appl. No.: 12/176,374

(22) Filed: Jul. 19, 2008

(65) Prior Publication Data

US 2010/0014578 A1    Jan. 21, 2010

(51) Int. Cl.
*H04N 7/12*    (2006.01)
(52) U.S. Cl. ............... 375/240.01; 375/240.26
(58) Field of Classification Search .................. None
See application file for complete search history.

(56) References Cited

U.S. PATENT DOCUMENTS

| | | | |
|---|---|---|---|
| 5,450,209 A | | 9/1995 | Nimura et al. |
| 5,561,464 A | * | 10/1996 | Park ............... 375/240.1 |
| 5,990,976 A | * | 11/1999 | Higashida ............ 348/588 |
| 6,043,853 A | * | 3/2000 | Shimazaki et al. ..... 348/625 |
| 6,160,586 A | * | 12/2000 | Justiss et al. ......... 348/452 |
| 6,441,844 B1 | * | 8/2002 | Tatsuzawa ............. 348/42 |
| 2003/0091339 A1 | | 5/2003 | Isozaki |
| 2006/0181740 A1 | * | 8/2006 | Kim et al. ............ 358/3.26 |
| 2007/0248163 A1 | | 10/2007 | Zuo et al. |
| 2007/0248164 A1 | | 10/2007 | Zuo et al. |
| 2008/0134232 A1 | | 6/2008 | Rhoads |
| 2009/0028452 A1 | | 1/2009 | Kimoto |

FOREIGN PATENT DOCUMENTS

| | | |
|---|---|---|
| EP | 0781053 | 6/1997 |
| EP | 1 511 323 A1 | 3/2005 |
| WO | WO-02073974 | 9/2002 |
| WO | WO-2006/118113 | 11/2006 |

OTHER PUBLICATIONS

Lee, Y. L. et al., "Loop-filtering and Post-filtering for Low Bit-rates Moving Picture Coding" Image processing 1999, ICIP 99, proceedings International Conference on—Kobe, Japan, Oct. 24-28, 1999, pp. 94-98.

Schwarz, H., et al."Overview of the Scalable Extension of the H.264/MPEG-4 AVC Video Coding Standard" ITU Study Group 16- video Coding Experts Group—ISO/IEC MPEG & ITU-T VCEG, No. JVT-U145, Oct. 20, 2006, pp. 1-20.

Extended European Search Report issued for EP09799893.4, dated Jul. 26, 201, 9 pages.

(Continued)

*Primary Examiner* — Hong Cho
(74) *Attorney, Agent, or Firm* — Fulbright & Jaworski L.L.P.

(57) ABSTRACT

Systems and methods are presented for compressing digital video signals in a manner that prevents the creation of block artifacts and improves compression efficiency by the selective removal of data representing visually imperceptible or irrelevant detail. Bandwidth control is improved through prioritized removal of data exceeding permissible bandwidth limits. This provides a process by which a coupled compressor and de-compressor system can effect the transmission or storage of video at low bitrates with high perceptual quality of the decompressed video. In one embodiment, the low frequency components are removed from a video stream and either stored or transmitted in compressed format separate from the storage or transmission of the high frequency components of the video stream. Certain high frequency video stream details can be suppressed to further reduce bitrate.

28 Claims, 3 Drawing Sheets

OTHER PUBLICATIONS

International Search Report and Written Opinion issue for International Application No. PCT/CA2009/000997 dated Oct. 6, 2009, 8 pgs.

International Search Report and Written Opinion issued for International Application No. PCT/CA2009/000999 dated for Oct. 6, 2009, 10 pgs.

* cited by examiner

SYSTEMS AND METHODS FOR HIGHLY EFFICIENT VIDEO COMPRESSION USING SELECTIVE RETENTION OF RELEVANT VISUAL DETAIL

CROSS-REFERENCE TO RELATED APPLICATIONS

This application is related to concurrently filed, co-pending, commonly owned patent applications SYSTEMS AND METHODS FOR IMPROVING THE QUALITY OF COMPRESSED VIDEO SIGNALS BY SMOOTHING BLOCK ARTIFACTS, U.S. patent application Ser. No. 12/176,371 filed Jul. 19, 2008, and SYSTEMS AND METHODS FOR IMPROVING THE QUALITY OF COMPRESSED VIDEO SIGNALS BY SMOOTHING THE ENTIRE FRAME AND OVERLAYING PRESERVED DETAIL, U.S. patent application Ser. No. 12/176,372 filed Jul. 19, 2009 which applications are hereby incorporated by reference herein.

TECHNICAL FIELD

This disclosure relates to digital video signals and more specifically to systems and methods for improving the quality of compressed digital video signals by taking advantage of features of the human vision system (HVS) which allow significant bitrate savings to be achieved for a given perceptual quality of the decompressed video.

BACKGROUND OF THE INVENTION

It is well-known that video signals are represented by large amounts of digital data, relative to the amount of digital data required to represent text information or audio signals. Digital video signals consequently occupy relatively large bandwidths when transmitted at high bit rates and especially when these bit rates must correspond to the real-time digital video signals demanded by video display devices.

In particular, the simultaneous transmission and reception of a large number of distinct video signals, over such communications channels as cable or fiber, is often achieved by frequency-multiplexing or time-multiplexing these video signals in ways that share the available bandwidths in the various communication channels.

Digitized video data are typically embedded with the audio and other data in formatted media files according to internationally agreed formatting standards (e.g. MPEG2, MPEG4, H264). Such files are typically distributed and multiplexed over the Internet and stored separately in the digital memories of computers, cell phones, digital video recorders and on compact discs (CDs) and digital video discs DVDs). Many of these devices are physically and indistinguishably merging into single devices.

In the process of creating formatted media files, the file data is subjected to various levels and types of digital compression in order to reduce the amount of digital data required for their representation, thereby reducing the memory storage requirement as well as the bandwidth required for their faithful simultaneous transmission when multiplexed with multiple other video files.

The Internet provides an especially complex example of the delivery of video data in which video files are multiplexed in many different ways and over many different channels (i.e. paths) during their downloaded transmission from the centralized server to the end user. However, in virtually all cases, it is desirable that, for a given original digital video source and a given quality of the end user's received and displayed video, the resultant video file be compressed to the smallest possible size.

Formatted video files might represent a complete digitized movie. Movie files may be downloaded 'on demand' for immediate display and viewing in real-time or for storage in end-user recording devices, such as digital video recorders, for later viewing in real-time.

Compression of the video component of these video files therefore not only conserves bandwidth, for the purposes of transmission, but it also reduces the overall memory required to store such movie files.

At the receiver end of the abovementioned communication channels, single-user computing and storage devices are typically employed. Currently-distinct examples of such single-user devices are the personal computer and the digital set top box, either or both of which are typically output-connected to the end-user's video display device (e.g. TV) and input-connected, either directly or indirectly, to a wired copper distribution cable line (i.e. Cable TV). Typically, this cable simultaneously carries hundreds of real-time multiplexed digital video signals and is often input-connected to an optical fiber cable that carries the terrestrial video signals from a local distributor of video programming. End-user satellite dishes are also used to receive broadcast video signals. Whether the end-user employs video signals that are delivered via terrestrial cable or satellite, end-user digital set top boxes, or their equivalents, are typically used to receive digital video signals and to select the particular video signal that is to be viewed (i.e. the so-called TV Channel or TV Program). These transmitted digital video signals are often in compressed digital formats and therefore must be uncompressed in real-time after reception by the end-user.

Most methods of video compression reduce the amount of digital video data by retaining only a digital approximation of the original uncompressed video signal. Consequently, there exists a measurable difference between the original video signal prior to compression and the uncompressed video signal. This difference is defined as the video distortion. For a given method of video compression, the level of video distortion almost always becomes larger as the amount of data in the compressed video data is reduced by choosing different parameters for those methods. That is, video distortion tends to increase with increasing levels of compression.

As the level of video compression is increased, the video distortion eventually becomes visible to the HVS and eventually this distortion becomes visibly-objectionable to the typical viewer of the real-time video on the chosen display device. The video distortion is observed as so-called video artifacts. A video artifact is observed video content that is interpreted by the HVS as not belonging to the original uncompressed video scene.

Methods exist for significantly attenuating visibly-objectionable artifacts from compressed video, either during or after compression. Most of these methods apply only to compression methods that employ the block-based Two-dimensional (2D) Discrete Cosine Transform (DCT) or approximations thereof. In the following, we refer to these methods as DCT-based. In such cases, by far the most visibly-objectionable artifact is the appearance of artifact blocks in the displayed video scene.

Methods exist for attenuating the artifact blocks typically either by searching for the blocks or by requiring a priori knowledge of where they are located in each frame of the video.

The problem of attenuating the appearance of visibly-objectionable artifacts is especially difficult for the widely-occurring case where the video data has been previously compressed and decompressed, perhaps more than once, or where it has been previously re-sized, re-formatted or color re-mixed. For example, video data may have been re-formatted from the NTSC to PAL format or converted from the RGB to the YCrCb format. In such cases, a priori knowledge of the locations of the artifact blocks is almost certainly unknown and therefore methods that depend on this knowledge do not work.

Methods for attenuating the appearance of video artifacts must not add significantly to the overall amount of data required to represent the compressed video data. This constraint is a major design challenge. For example, each of the three colors of each pixel in each frame of the displayed video is typically represented by 8 bits, therefore amounting to 24 bits per colored pixel. For example, if pushed to the limits of compression where visibly-objectionable artifacts are evident, the H.264 (DCT-based) video compression standard is capable of achieving compression of video data corresponding at its low end to approximately 1/40th of a bit per pixel. This therefore corresponds to an average compression ratio of better than 40×24=960. Any method for attenuating the video artifacts, at this compression ratio, must add therefore an insignificant number of bits relative to 1/40th of a bit per pixel. Methods are required for attenuating the appearance of block artifacts when the compression ratio is so high that the average number of bits per pixel is typically less than 1/40th of a bit.

For DCT-based and other block-based compression methods, the most serious visibly-objectionable artifacts are in the form of small rectangular blocks that typically vary with time, size and orientation in ways that depend on the local spatial-temporal characteristics of the video scene. In particular, the nature of the artifact blocks depends upon the local motions of objects in the video scene and on the amount of spatial detail that those objects contain. As the compression ratio is increased for a particular video, MPEG, DCT-based video encoders allocate progressively fewer bits to the so-called quantized basis functions that represent the intensities of the pixels within each block. The number of bits that are allocated in each block is determined on the basis of extensive psycho-visual knowledge about the HVS. For example, the shapes and edges of video objects and the smooth-temporal trajectories of their motions are psycho-visually important and therefore bits must be allocated to ensure their fidelity, as in all MPEG, DCT-based methods.

As the level of compression increases, and in its goal to retain the above mentioned fidelity, the compression method (in the so-called encoder) eventually allocates a constant (or near constant) intensity to each block and it is this block-artifact that is usually the most visually objectionable. It is estimated that if artifact blocks differ in relative uniform intensity by greater than 3% from that of their immediately neighboring blocks, then the spatial region containing these blocks is visibly-objectionable. In video scenes that have been heavily-compressed using block-based DCT-type methods, large regions of many frames contain such block artifacts.

BRIEF SUMMARY OF THE INVENTION

Systems and methods are presented for compressing digital video signals in a manner that minimizes and can even prevent the creation of block artifacts and improves compression efficiency using the selective removal of data representing visually imperceptible or irrelevant detail. Bandwidth control is improved through prioritized removal of data exceeding permissible bandwidth limits. This provides a process by which a coupled compressor and de-compressor system can effect the transmission or storage of video at low bitrates with high perceptual quality of the decompressed video.

In one embodiment, the concepts discussed in the above-identified co-pending patent applications entitled SYSTEMS AND METHODS FOR IMPROVING THE QUALITY OF COMPRESSED VIDEO SIGNALS BY SMOOTHING BLOCK ARTIFACTS and SYSTEMS AND METHODS FOR IMPROVING THE QUALITY OF COMPRESSED VIDEO SIGNALS BY SMOOTHING THE ENTIRE FRAME AND OVERLAYING PRESERVED DETAIL may be used in combination with the concepts discussed herein to reduce the required bandwidth for transmission of the 'Carrier' video stream. The compression/decompression process described herein takes advantage of features of the HVS which allow significant bitrate savings to be achieved for a given perceptual quality of the decompressed video.

One important observation is that the HVS is relatively fast at perceiving the overall structure and motion of objects, but is slower to 'focus in' on fine detail. For example, a baseball batter can perceive the motion of a pitcher and ball sufficiently quickly to initiate an appropriate reaction and hit the ball with reasonable reliability, but will have little or no perception of the fine details of the threads or scuff-marks on the ball as it moves and spins in its flight. On the other hand, if that ball were stationary and placed a few feet away from the batter, he/she could perceive and describe these details quite precisely. Advantage is taken of this characteristic of the HVS by suppressing the appearance of such imperceptible detail as the threads on a fast-spinning ball so that it does not consume bandwidth in the compressed video representation.

In addition to the reaction rate characteristics described above, other HVS characteristics may be leveraged to increase compression efficiency. For a given bandwidth, perceived video quality may be optimized by prioritizing the transmission of the 'most relevant' details in a video sequence. So, for example, stationary or slow-moving details will generally have higher priority than fast-moving details. Similarly, for most types of video the details near the centre of the video may be more 'relevant' to the viewer than details around the periphery of the image. Bandwidth may be utilized accordingly to convey the central details with greater fidelity than the peripheral details.

The HVS also tends to be highly sensitive to specific image components such as human facial features. An encoding system sufficiently powerful to incorporate facial recognition capabilities can prioritize such recognized regions so they are presented with greater fidelity.

A further HVS characteristic addressed by the concepts discussed herein is similar to those treated by the Deblocking methods described in the above-identified applications, namely, the fact that the HVS is highly sensitive to sharp geometrically-extensive artifacts in otherwise smooth regions of an image. The present method is specifically formulated to retain the smooth appearance of images even in extraordinarily low-bandwidth scenarios. This is in contrast to conventional DCT block-based methods which tend to produce highly objectionable block artifacts in low-bandwidth scenarios.

In contrast to wavelet methods, this method achieves lower bandwidths, in part, due to its capability to selectively suppress detail and productively use motion estimation and compensation to achieve excellent compression for high-motion scenes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
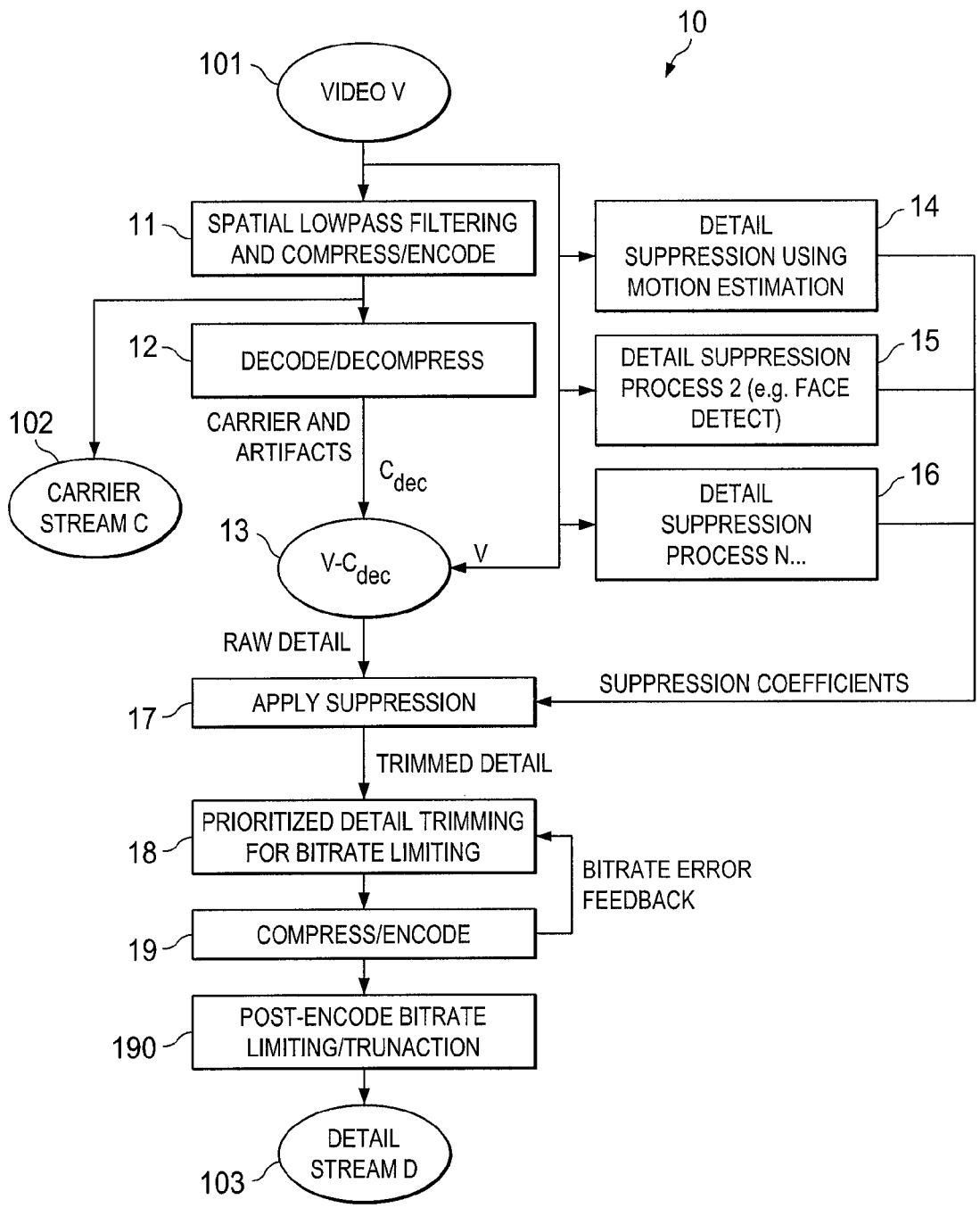
FIG. 1 shows one embodiment of a method for encoding video frames according to the concepts discussed herein.

FIG. 1 shows one embodiment 10 of a method for encoding/compressing video frames according to the concepts discussed herein. This method can be used, by way of example, in system 30 shown in FIG. 3. Methods 10 and 20 can be, for example, software running in processors 32-1, 34-1, respectively. Also, the methods can be in firmware or ASICs if desired.

FIG. 1 illustrates an embodiment of a compression process which realizes the advantages described above, and which achieves important goals of an effective video transmission or storage system, including the use of very low bitrates for a given perceptual quality while maintaining a satisfactory image quality in low-bandwidth scenarios, The system has the capability of supporting precise single-pass control of compressed video stream bitrates while having robust handling of 'difficult' scenes such as high-motion, variable-motion, or chaotic video with a minimum of objectionable or distracting artifacts. The output of the compression/encode process is a pair of video streams 102 and 103, denoted the 'carrier C' and 'detail D' streams, respectively. These streams are conveyed to decoder/decompressor process 20 in FIG. 2 which shows one embodiment of a method for decoding video frames according to the concepts discussed herein. As will be discussed, process 20 illustrates a decompression process, complementary to the compression process of FIG. 1, which decodes and reconstructs the video while simultaneously minimizing the perceptible appearance of distortions or artifacts related to the highly compressed nature of the encoded video.

Turning now to FIG. 1, process I extracts, compresses and encodes the low frequency spatial components of the incoming video stream to produce 'carrier stream C' 102. The low spatial bandwidth of this carrier stream implies that it has limited information content, and is thus highly compressible. The spatial bandwidths retained must be low enough to ensure that the carrier stream, when decompressed, avoids block artifacts. The spatial bandwidths retained must be high enough to ensure that the carrier stream, when decompressed, provides a visually satisfactory low-detail representation of the original video stream.

The extraction of low-frequency components and subsequent compression/encoding described above may be achieved in any of a number of well-known methods. One example method is to perform a frequency-domain down-sampling, resulting in a low-detail stream for efficient compression/encoding. An example of a suitable frequency-domain down-sampling process would be to perform a DCT (discrete cosine transform) on 8×8 blocks of the source video, discard all but the top-left 2×2 block of the resulting coefficients, scale the right, bottom, and bottom-right coefficients of that 2×2 subset downwards to slightly reduce high-frequency information, and then perform an inverse DCT on the resulting 2×2 blocks to generate a spatially down-sampled image with frequency characteristics amenable to efficient compression by a conventional DCT-based encode process.

The remainder of process 10 is devoted to creating the 'detail D' output stream 103. Conceptually, the detail stream may be thought of as the 'remainder' of the video such that the sum of the carrier C and detail D streams, if losslessly encoded, reproduce the original video. In practice, it is the method for producing and manipulating the detail stream that create many of the advantages of this compression method.

Figure 2:
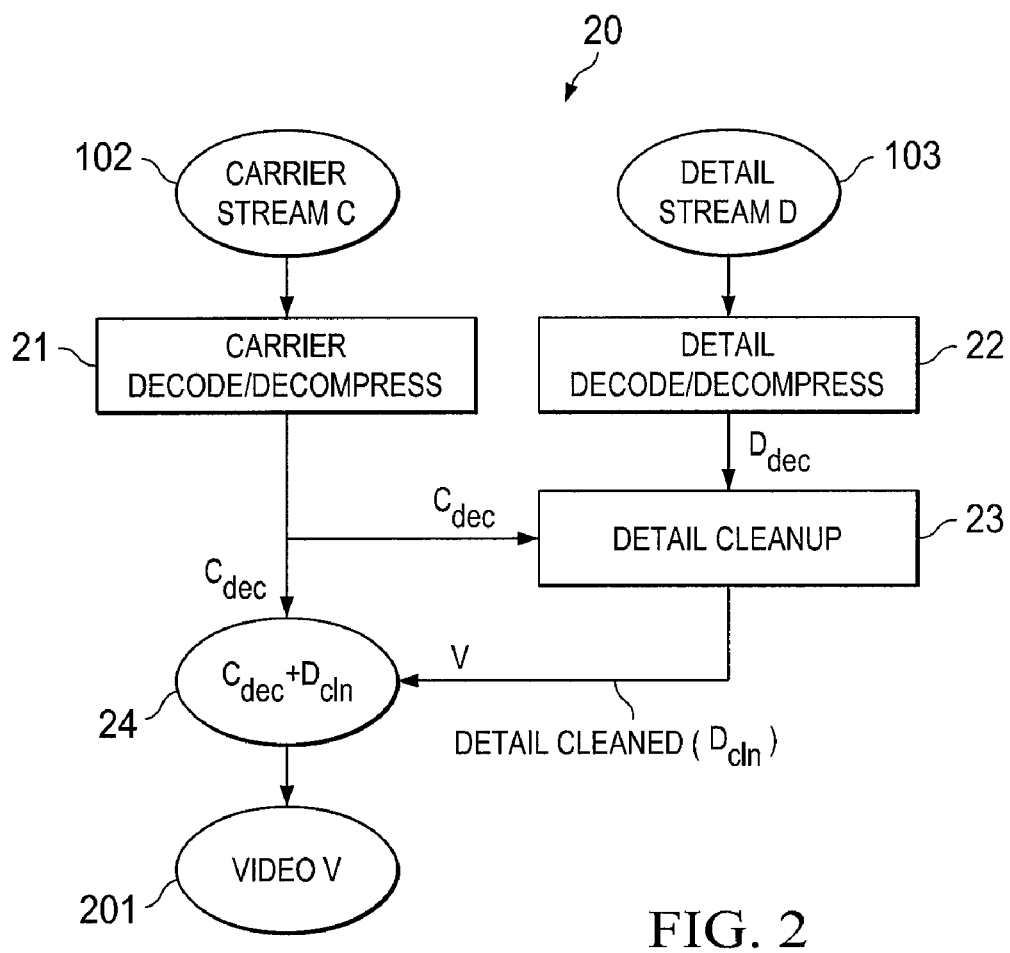
FIG. 2 shows one embodiment of a method for decoding video frames according to the concepts discussed herein.

Process 12 decodes the encoded carrier stream from process 11 in the same fashion as it will be decoded in process 20 (FIG. 2). This produces an approximation of the original video. Process 13 subtracts the original video stream V from the "approximate" video stream $C_{dec}$. This produces the raw detail video data which, if it could be sent to the decoder without loss, would allow for the exact reconstruction of the original video on the decode side.

An important point to note is that the raw detail data incorporates 'corrections' for any artifacts that may have been introduced in the carrier encode process, because it was derived from the carrier in exactly the same way as is done on the decoder. This constitutes a feedback loop on the encoder that can substantially increase the quality of the video regenerated by the decoder.

The raw detail video data from process 13 is in the form of signed values centered about zero, typically using signed 8 bit representation for each component color channel, though other representations are equally valid. The detail data is also generally of small magnitude, especially in regions of the original video that are spatially smooth and thus well approximated by the carrier stream.

Processes 14, 15 and 16 pertain to selective detail suppression applied to the detail video data to eliminate imperceptible or otherwise irrelevant detail to produce a 'trimmed' detail stream. The detail suppression processes generate suppression coefficients corresponding to areas of the detail stream to be suppressed or retained.

An example detail-suppression method is represented by process 16 in which the source video is analyzed via conventional motion-estimation techniques to find the location and magnitude of motion in the original video in order to determine areas where the magnitude of the motion begins to approach the response rate limits of the HVS. In areas where little or no motion is detected, the suppression coefficients are set to preserve the corresponding detail stream areas (no suppression). In areas where the motion velocity exceeds the HVS response rate limits, the suppression coefficients are set to eliminate the corresponding detail stream areas (full suppression). Motion magnitudes between these limits result in coefficients signaling partial suppression of the corresponding detail stream areas, varying from no suppression to full suppression according to the magnitude.

Note that the motion estimates required for the above process may be derived in many ways. For example, motion estimates may be obtained from the carrier encoder, if the encoder is a block-based encoder that uses motion estimation internally. This has the practical effect of reducing the amount of encode time spent doing motion estimation, but is not strictly required.

Other detail management/suppression methods, such as facial recognition 15, de-emphasizing peripheral area details, or emphasis/de-emphasis of other regions of known HVS sensitivity/insensitivity, or of relative interest/disinterest can also be used alone or in combination, each supplying suppression coefficients to be applied to the detail stream by process 17.

Process 17 can be any one of many well-known processes for applying suppression coefficients to preserve or eliminate detail areas. One such process involves simple multiplication of detail values by suppression coefficients represented as spatially-varying scalar values ranging from 0.0 to 1.0. In areas where detail is to be fully suppressed, the corresponding suppression coefficient value is 0.0, while areas where detail is to be fully preserved have a corresponding suppression coefficient of 1.0. Partial suppression is achieved by coefficient values greater than 0.0 and less than 1.0. The nature of the detail data (zero-centered values of generally low magnitude) is well suited to allow simple suppression of this type. An alternate suppression method could perform quantization of the detail stream data such that areas to be fully preserved are quantized very finely (i.e. fully preserving luminance and chrominance accuracy), while areas to be suppressed are quantized more coarsely according to the level of suppression. In this case, the most coarsely quantized detail values are set to zero.

In some situations (such as single-pass video encoding for bandwidth-limited channels), it is desirable to limit the bitrate of the encoded detail stream. In one embodiment, after the detail video stream has been 'trimmed' by process 14 but before encoding, process 18 estimates for each frame being processed what the compressed/encoded output size is likely to be. For most encoding methods, this can be estimated with fair accuracy (~15%). Given this estimate, the system can retroactively adjust the amount of data to be encoded such that the target bitrate is better achieved. The zero-centered form of the detail data is such that detail suppression methods can easily be applied. These can be the same detail suppression methods described above to eliminate (or otherwise render more compressible) lower-priority portions of the details.

Process 18 can determine the priority of an area of detail in various ways. A simple metric such as average energy (i.e. standard deviation) of a detail area is one example. Eliminating areas with low standard deviation will have little perceptible effect on the decoded video, but the process can quickly reduce the amount of data to be encoded until it falls within the target bandwidth. More sophisticated prioritization metrics, such as focal point analysis or peripheral region de-emphasis, may also be used.

Process 19 encompasses the actual encoding of the detail video stream. The encode method should ideally be well suited to encoding high spatial frequency video data, and need not be the same encode method as used in process 11. After encoding each frame, the achieved bitrate can be compared to the target bitrate, while feeding back any bitrate error to process 18 to improve subsequent compression estimates. With this feedback and the ability to arbitrarily adjust the amount of detail data to be retained, fine control over output bitrate can be achieved without necessarily resorting to multiple encode passes. An achievable target bitrate is 1/100th of a bit per pixel (bpp).

Note that in the case of DCT-based encoders, process 190 is used as a post-process to supplement or eliminate the feedback loop above and directly modify macroblocks in the generated output stream until the bandwidth constraints are met. Here again the zero-centered nature of the detail stream makes it possible to save bandwidth by effectively zeroing the contents of low-priority macroblocks until bandwidth targets are met. Such content zeroing would be invalid in a conventional DCT-based encoded stream due to the high DC content. This post-adjustment detail trimming makes it possible to achieve target bandwidth limits with high precision without requiring multiple expensive encode passes. This post-processing is more difficult than the preprocessing of process 18 because the encoded bitstream must be parsed/decomposed to expose macroblock information, modified to nullify low-priority macroblocks, and then recomposed, but it achieves better per-frame precision.

An important feature of the detail encode process is that despite the relatively low bitrate (relative to that normally required to represent frames at the given resolution), it is immune to blocking effects even if the encoder used is block-based (DCT-based). Blocking occurs when adjacent macroblocks in a decoded image have little or no detail within them but have different DC levels. Since in the detail stream every encoded macroblock is zero-centered, and there is essentially no DC information present, there can be no DC offset to produce blocking.

As a practical matter, it should be noted that most conventional video encoders cannot directly handle signed input data. In such cases, an offset value (typically 128 for image data with a bit depth of 8) must be added to the signed data to produce unsigned values suitable for compression. This does not affect the 'block immunity' advantage described above, as every macroblock becomes 128-centered rather than zero-centered. There is still essentially no source of DC/low frequency offset to produce blocking effects.

It should be noted that since the detail stream is very strongly compressed, it is to be expected that compression artifacts will be introduced. This is indeed the case, but those artifacts tend to be more subtle in nature than the highly-visible blocking artifacts typical of highly compressed video using DCT-based techniques. For the detail stream, the most prevalent artifact occurs when there is insufficient bandwidth to send new detail data for a macroblock and instead the decoder simply duplicates the same macroblock contents as existed on the previous frame. These copied macroblock contents, while generally having little image energy, create the impression of a 'haze' that remains stationary even when the underlying carrier image, and other parts of the detail image change. A critical benefit of the present invention is that this kind of artifact can generally be detected and remedied on the decode side, resulting in a more subtle loss of detail rather than a sharp highly-visible artifact. The process for detecting and treating this type of artifact is discussed in the decode operation description below.

FIG. 2 shows one embodiment 20 of a method for the decoding of video data previously compressed according to method 10. Process 21 decompresses carrier stream C 102 (from FIG. 1) and process 22 decompresses detail stream D 103 (from FIG. 1).

A decoder embodiment could just add the decoded carrier and the detail stream (and subtract out the (e.g.) 128 offset that may have been applied for encoding), resulting in a displayable video stream. This is a viable approach for relatively high-bitrate encodes that do not show a significant 'haze' artifact (as described previously). However, for those situations where higher compression has caused a perceptible 'haze' effect, an additional cleanup process, such as process 23, may be applied.

Process 23 examines both the decoded detail $D_{dec}$ and decoded carrier $C_{dec}$ frames to find copied detail macroblocks that result in the haze effect. There are many possible embodiments of such a process, but the central idea is to use information from the reliable high fidelity carrier stream to determine where the lower-fidelity detail stream information is incorrect or unreliable. A preferred embodiment of process 23 consists of a series of tests as described below. These tests are applied to blocks of pixels in the detail video frames and the corresponding pixels of the carrier video frames. If the tests determine that the block is 'haze', its contents are nullified (i.e. there is no detail, and only the carrier is retained in the corresponding location). Note that the blocks to which these tests are applied should be chosen according to the DCT-based encode/decode method used for the detail stream. If the method marks only entire macroblocks as being copied, then the blocks tested here should correspond directly to those macroblocks. If the method allows for partitioning macroblocks into sub-blocks that can be marked individually for copying, the blocks tested here should correspond to the sub-blocks.

It is possible for the results of a block test to be inconclusive as well. To deal with this situation, the results of the 'haze test' are retained from frame to frame. If a block was assessed to be 'haze' on the previous frame and the test on the current frame is inconclusive, we retain the previous assessment and assume that the block is haze on this frame as well. Similarly, if the block was not haze on the previous frame, the same assessment is retained if the test for the current frame is inconclusive. For the very first frame in a video sequence, it is assumed that all details are valid (and the 'haze state' for every block defaults to 'not haze').

The tests require access to both the current carrier and detail video frames and to the immediately previous carrier and detail frames (for change detection). The tests are as follows (execute for each block):

1) If the detail block contents were not copied from the previous frame, the block is not haze (end test). Note that the determination of whether the contents were copied may be explicit or implicit: it may be possible to obtain the 'copy flags' directly from the decoder, or alternately the detail block contents may be compared between frames with the assumption that an exact match implies that the detail block was copied.
2) If the standard deviation of the detail block contents is too high (i.e., strongly textured), the block is most likely not haze (end test). Most 'haze' blocks are completely flat (i.e., standard deviation of zero): high energy in the block tends to imply that it is not an artifact. In addition, true 'haze' is less obvious in areas where the image has a lot of natural texture so even if we miss some haze due to this rule it is likely to be obscured. The 'high' threshold is specified as a decoder control parameter. A typical 'high' threshold value that has been found to work in practice is approximately 1% of the total available brightness range.
3) If the mean value of the detail block contents is 'too far' from zero, it has too much energy to be considered to be haze (end test). The 'too far' threshold is specified as a decoder control parameter. A typical mean value that has been found to work in practice is approximately 4% of the total available brightness range.
4a) If the carrier pixel corresponding to the current block has changed 'significantly' since the last frame, then the block most likely is 'haze' and should be nullified (end test). The 'significantly' threshold is specified as a decoder control parameter. A typical 'significantly' threshold value that has been found to work in practice is approximately 0.5% of the total available brightness range.
4b) If motion estimation on the carrier indicates that the image in the vicinity of the current block is moving, then the block most likely is 'haze' and should be reset to zero (end test). Note that this test may be prohibitive for inexpensive decoder hardware, and therefore may be considered optional.
5) Test was ambiguous: neither carrier nor detail has changed, and energy is fairly low. Reuse the assessment result from the previous frame.

Process 24 sums the decoded carrier stream $C_{dec}$ and the 'de-hazed' (i.e. cleaned) detail stream to produce the final reconstructed video V 201.

Figure 3:
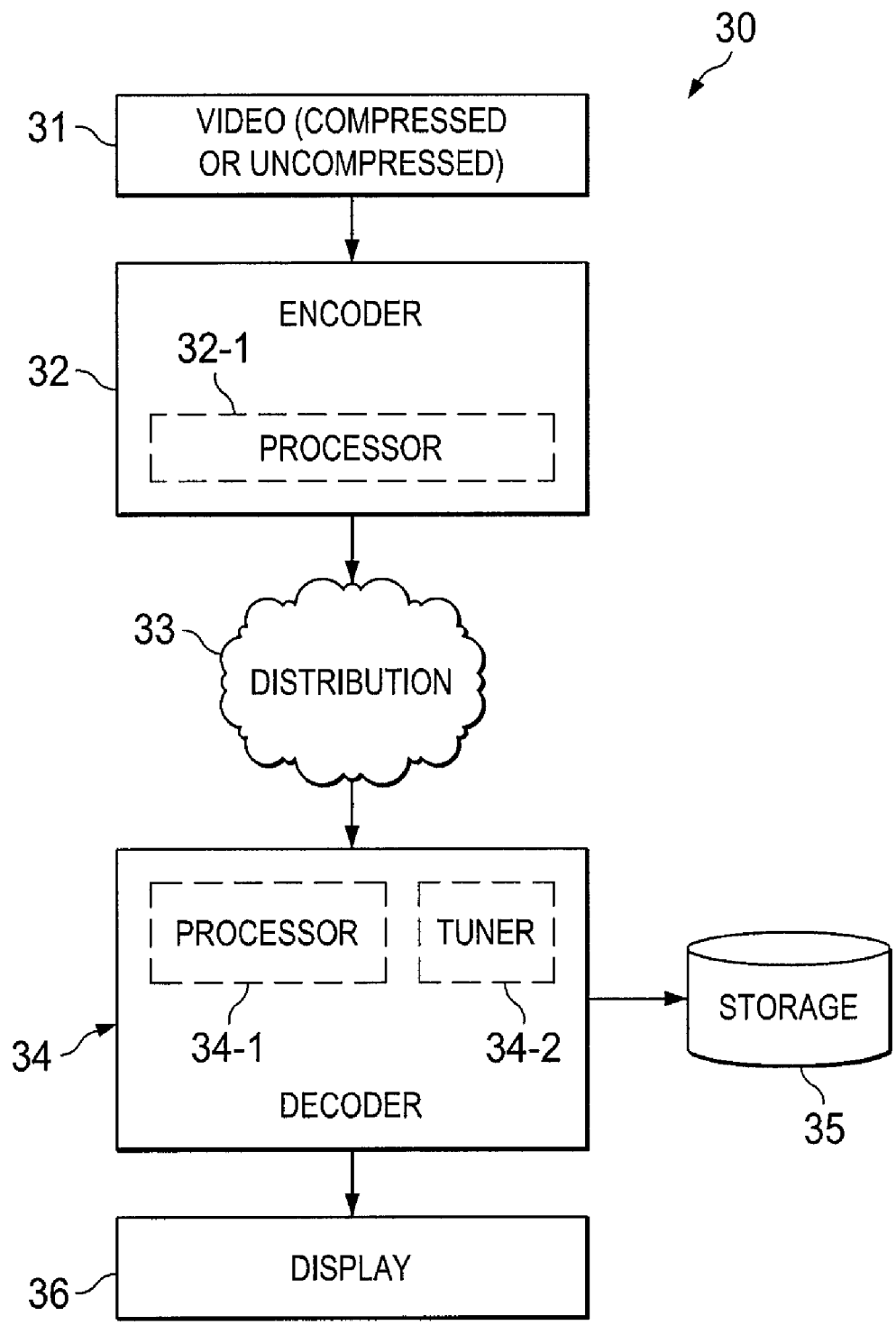
FIG. 3 shows one embodiment of a system in which the encoder and decoder concepts discussed herein can be advantageously employed.

FIG. 3 shows one embodiment 30 of the use of the concepts discussed herein. In system 30 video (and audio) is provided as an input 31. This can come from local storage, not shown, or received from a video data stream(s) from another location. This video can arrive in many forms, such as through a live broadcast stream, or video file and may be pre-compressed prior to being received by encoder 32. Encoder 32, using the processes discussed herein processes the video frames under control of processor 32-1. The output of encoder 32 could be to a file storage device (not shown) or delivered as a video stream, perhaps via network 33, to a decoder, such as decoder 34. In one embodiment, process 10 would be performed by encoder 32 and process 20 would be performed by decoder 34. Transmission from the decoder to the encoder can be performed in any well-known manner using wireline or wireless transmission while conserving bandwidth on the transmission medium.

If more than one video stream is delivered to decoder 34 then the various channels of the digital stream can be selected by tuner 34-2 for decoding according to the processes discussed herein. Note that the various video channels can be sent from a single location, such as from encoder 32, or from different locations, not shown. The output decoded video stream(s) can be stored in storage 35 or displayed by one or more displays 36 or, if desired, distributed (not shown) to other locations. Also note that the carrier stream and the detail stream need not be transmitted at the same time or on the same transmission media, provided that prior to recombination the two streams are properly coordinated.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for delivering a digital video stream, said method comprising:
   subtracting identified low frequency components from said digital video stream to produce an AC-only video stream;
   encoding said AC-only video stream;
   encoding a low frequency video stream obtained from said digital video stream at a bit rate sufficient to avoid block artifacts; and
   delivering both of said encoded video streams to a location remote from said encoding location.

2. The method of claim 1 further comprising:
   decoding said encoded low frequency and AC-only video streams at said remote location to recreate said digital video signal.

3. The method of claim 2 further comprising:
   algorithmically eliminating undesirable artifacts from said recreated video signal.

4. The method of claim 3 wherein said undesirable artifacts are created, at least in part, by copied macroblocks across frames of said video stream, and wherein said copied macroblocks are determined by:
   examining both said decoded low frequency and AC-only video streams, and
   using information from the low frequency video stream to determine when information contained in said AC-only stream is unreliable.

5. The method of claim 3 wherein said bitrate can be as low as $1/100^{th}$ of a bit per pixel (bpp).

6. The method of claim 2 further comprising:
   delivering said recreated video stream to a display such that an HVS viewing said display is minimally disturbed by data removed from said input video stream by said encoding of said AC-only video stream.

7. The method of claim 1 further comprising:
   removing certain details from said AC-only video stream prior to said encoding of said AC-only video stream, said removed details being such as to have a low impact on a human vision system (HVS).

8. The method of claim 7 wherein said removed details are selected using criteria from the list of: motion estimation, facial detection, peripheral area detection.

9. The method of claim 7 further comprising:
   prioritizing said detail removing based on a particular transmission bitrate.

10. The method of claim 9 wherein said particular bitrate is in the range of $1/100^{th}$ bpp.

11. The method of claim 7 further comprising:
    anticipating a compressed output size for a video stream at a point in time; and
    using said anticipated output size to control an amount of detail removed from said video stream.

12. The method of claim 1 wherein said subtracting comprises:
    decoding said encoded low frequency video stream and subtracting said decoded low frequency video stream from said digital input video stream.

13. A system for video stream compression, said system comprising:
    a processor for separating an available video stream into first and second video streams, said first video stream containing exclusively low frequency data obtained from said available video stream and said second video stream containing all remaining data obtained from said available video stream;
    said processor further operative for suppressing certain details from said second video stream to produce a third video stream with reduced information content; and
    a transmitter for sending both said first and said third video streams to a remote location in compressed format.

14. The system of claim 13 further comprising:
    decoders for independently decompressing both said first and third encoded video streams; and
    an adder for combining said decompressed first and third video data streams.

15. The system of claim 14 further comprising:
    a display for displaying said combined decompressed video streams to a viewer such that said viewer will receive a similar visual experience as that provided by the original video stream even though said combined video stream is missing data representing certain details.

16. The system of claim 15 wherein said certain missing details pertain to at least one of the following: fast-moving details, peripheral details, non-facial details.

17. The system of claim 14 further comprising:
    a storage device for storing said first and third video streams.

18. A method for compressing an input digital video stream, said method comprising:
    spatially filtering low frequency components from said input video stream to create an encoded carrier stream;
    decoding said carrier stream;
    producing a raw detail video stream by subtracting said decoded carrier stream from said video stream;
    producing a trimmed detail video stream by applying suppression to certain details in said raw detail video stream; and
    encoding said trimmed detail video stream.

19. The method of claim 18 further comprising:
    storing both said encoded trimmed detail video stream and said encoded carrier stream.

20. The method of claim 18 further comprising:
    truncating said trimmed detail video stream to conform to a desired bitrate.

21. The method of claim 18 wherein said suppression comprises:
    generating coefficients relative to certain aspects of a video stream, said aspects pertaining to at least one attribute of a video stream selected from the list of: facial details, motion estimation, peripheral details.

22. The method of claim 18 further comprising:
    transmitting both said encoded trimmed detail video stream and said encoded carrier stream to a decoder.

23. The method of claim 22 wherein said decoder performs the method of:
    decoding each of said transmitted video streams; and
    combining said decoded video streams into an output stream.

24. The method of claim 23 further comprising:

presenting said output stream to a display such that a viewer of said displayed output video stream will receive a similar visual experience as that provided by said input video stream even though said combined output video stream is missing data representing said suppressed details.

25. The method of claim 24 further comprising:

cleaning said decoded trimmed detail video stream prior to said combining.

26. The method of claim 25 wherein said cleaning removes haze effects from said output video stream.

27. A method for reducing the bandwidth requirement for delivering a digital video signal from a source to a destination, said method comprising:

down sampling an accepted a digital video signal from a source to form a signal having relatively low resolution components of said digital video signal;

encoding said low resolution signal components for transmission;

using said down sampled signal to remove from said accepted digital signal said low resolution components, thereby creating an AC signal; and encoding said AC signal for transmission in conjuntion with said encoded low resolution signal.

28. The method of claim 27 wherein a combined transmission bandwidth of said encoded AC signal and said low resolution signal to said destination is less than bandwidth required to transmit said accepted video signal to said destination.

* * * * *